(12) United States Patent
McClanahan et al.

(10) Patent No.: US 8,211,196 B2
(45) Date of Patent: Jul. 3, 2012

(54) FUEL GAS CONDITIONING SYSTEM

(75) Inventors: Jack L. McClanahan, Montgomery, TX (US); Craig S. Tiras, Houston, TX (US)

(73) Assignee: Gaumer Company, Inc., Houston, TX (US)

( * ) Notice: Subject to any disclaimer, the term of this patent is extended or adjusted under 35 U.S.C. 154(b) by 0 days.

(21) Appl. No.: 13/027,920

(22) Filed: Feb. 15, 2011

(65) Prior Publication Data

US 2011/0168691 A1      Jul. 14, 2011

Related U.S. Application Data

(63) Continuation of application No. 13/011,600, filed on Jan. 21, 2011, and a continuation of application No. 12/029,957, filed on Feb. 12, 2008, now abandoned.

(60) Provisional application No. 60/889,324, filed on Feb. 12, 2007.

(51) Int. Cl.
*B01D 46/00* (2006.01)
*H05B 3/78* (2006.01)

(52) U.S. Cl. ............... 55/385.1; 55/418.1; 55/490.1; 95/273; 219/438; 392/485

(58) Field of Classification Search ............. 55/385.1, 55/410.1, 418.1, 467.1, 490.1; 95/172, 173, 95/178, 227, 273, 283, 288; 44/904; 48/65, 48/198.1, 198.3; 219/438; 392/485, 486, 392/488, 490

See application file for complete search history.

(56) References Cited

U.S. PATENT DOCUMENTS

| | | |
|---|---|---|
| 6,364,933 B1 | 4/2002 | Heath |
| 6,551,379 B2 | 4/2003 | Heath |
| 6,592,641 B2 | 7/2003 | Alvin et al. |
| 7,442,239 B2 | 10/2008 | Armstrong et al. |

OTHER PUBLICATIONS

File History of U.S. Appl. No. 12/029,957, filed Dec. 12, 2008.

*Primary Examiner* — Robert Clemente
(74) *Attorney, Agent, or Firm* — Bracewell & Giuliani LLP

(57) ABSTRACT

A feed gas conditioner includes a pressure vessel that encloses at least part of a pre-heater. The pre-heater has an inlet for connection to a source of feed gas and an outlet for delivering the feed gas into the interior of the pressure vessel. An electrical heater element located within the pre-heater increases the temperature of the feed gas as it flows through the pre-heater. An expansion valve reduces the pressure of the feed gas as it flows from the pre-heater so as to initiate condensation. A super heater is at least partially located within the pressure vessel and has an inlet within the interior of the pressure vessel. A filter is in a flow path in the pressure vessel leading from the pre-heater heater to the super heater for removing condensate from the feed gas. An electrical heater element is in the super heater for heating the feed gas.

15 Claims, 2 Drawing Sheets

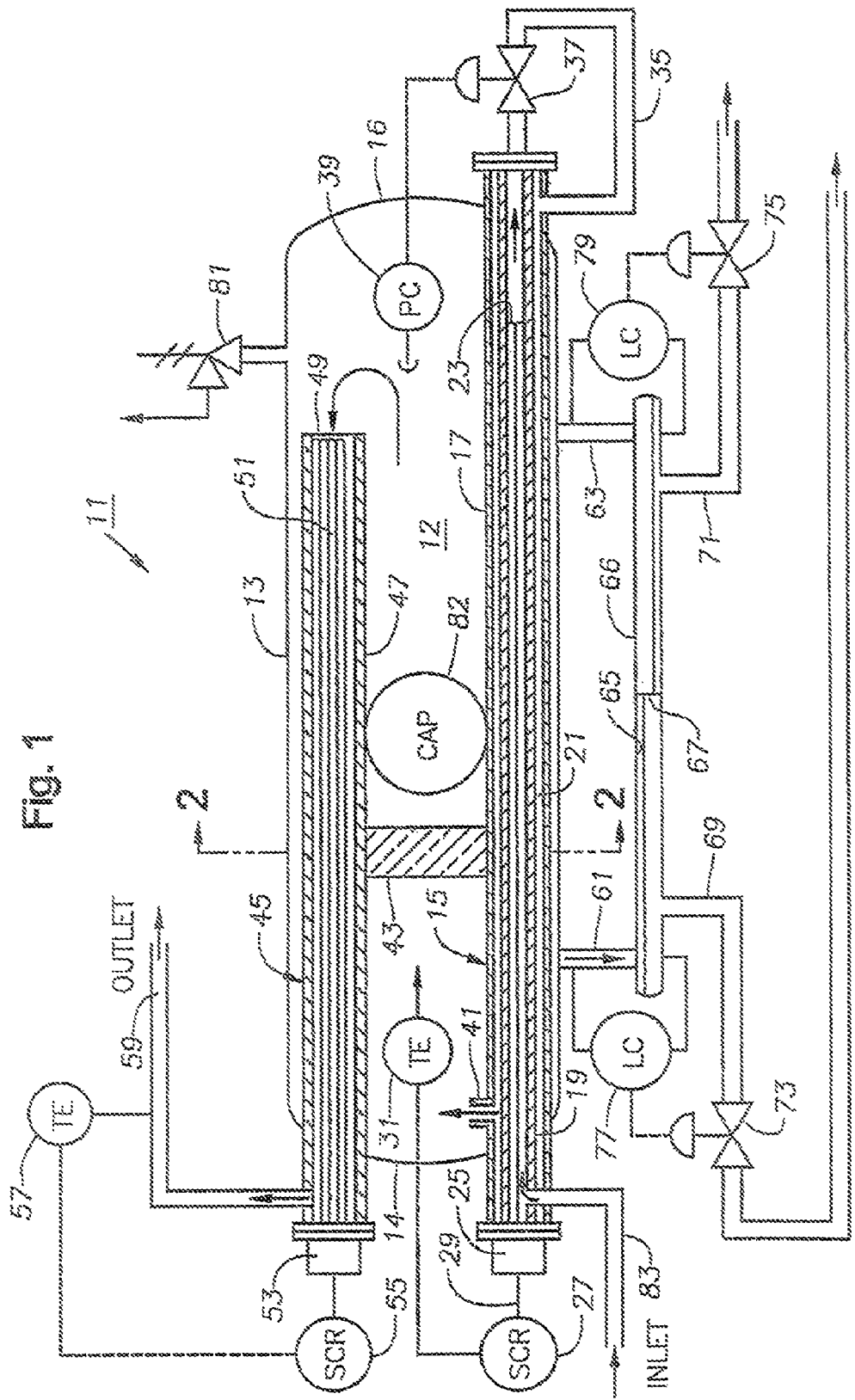

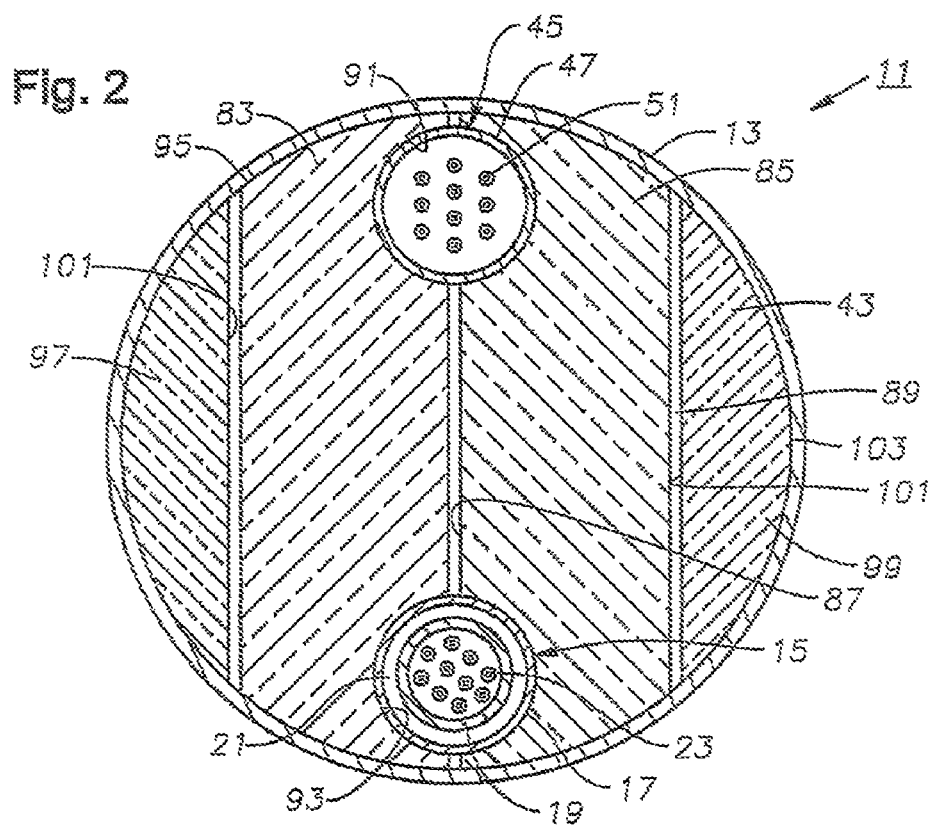
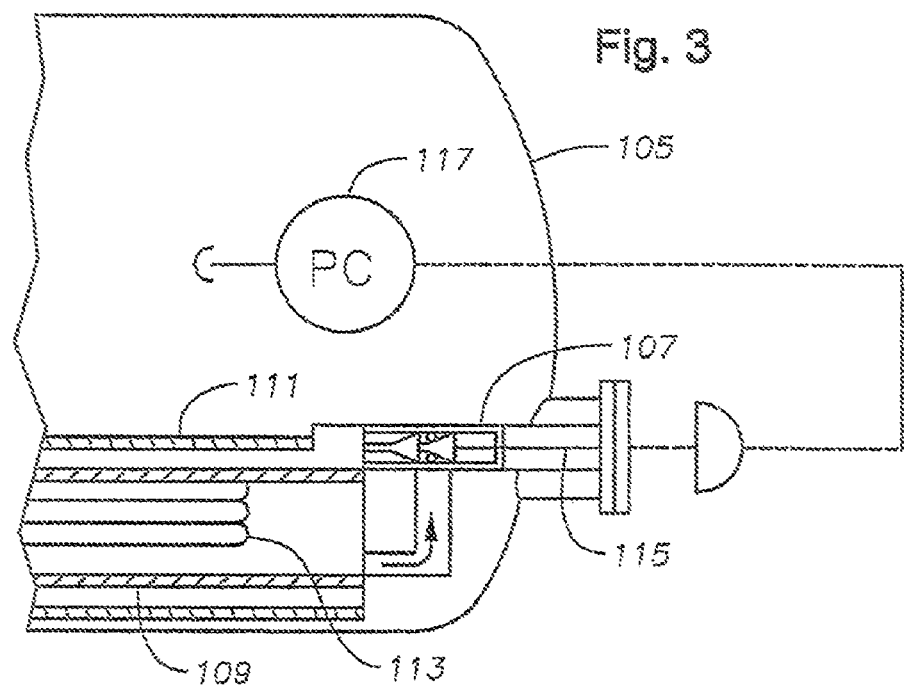

FUEL GAS CONDITIONING SYSTEM

CROSS-REFERENCE TO RELATED APPLICATION

This application is a continuation of U.S. utility patent application Ser. No. 13/011,600, filed on Jan. 21, 2011, which is a continuation of U.S. utility application Ser. No. 12/029,957, filed on Feb. 12, 2008, which claimed priority to provisional application 60/889,324, filed Feb. 12, 2007, the disclosure of which are incorporated herein by reference.

This application is also related to U.S. utility patent application Ser. No. 12/339,811, filed Mar. 6, 2009; U.S. utility patent application Ser. No. 12/553,808, filed on Sep. 3, 2009, U.S. utility patent application Ser. No. 12/553,823, filed Sep. 3, 2009, U.S. utility patent application Ser. No. 12/584,610; filed Sep. 9, 2009, U.S. utility patent application Ser. No. 12/584,626, filed Sep. 9, 2009, and U.S. utility patent application Ser. No. 12/584,640, filed Sep. 9, 2009.

FIELD OF THE INVENTION

This invention relates in general to an apparatus for converting a natural gas from a feed line to a superheated, clean and dry fuel gas for a gas turbine.

BACKGROUND OF THE INVENTION

Gas turbines are normally supplied with a dry gas that is superheated a selected level above its due point. The super heat avoids any liquids in the gas condensing as the temperature drops.

A typical conditioning system is made up of several pieces of equipment connected together by flowlines. This equipment may include a pre-heater to pre-heat the feed gas flowing into the system. An expansion valve is located in a flowline leading from the pre-heater to a gas scrubber. The expansion valve drops the temperature below the dew point of the gas. Typically, the gas scrubber comprises a cylindrical pressure vessel oriented upright, with the inlet at a lower portion and the outlet at an upper end. A coalescing filter is located between the inlet and the outlet for removing the condensate as the gas flows through. The gas flows then to a super heater, which heats the gas to a desired temperature above the dew point. The gas then flows through another filter to the gas turbine.

While this system works well, it takes up considerable space. Some facilities may lack adequate space. Also, the separate pieces of equipment add to the cost.

SUMMARY

In this invention, a gas conditioning system is provided that is substantially contained within a single pressure vessel. A pre-heater heater element housing is at least partially located within the pressure vessel. The pre-heater heater element housing has an inner passage with an inlet for connection to a source of feed gas and an outlet for delivering the feed gas into the interior of the pressure vessel. At least one electrical heater element is located within the inner passage of the pre-heater heater element housing for increasing the temperature of the feed gas as it flows through the pre-heater heater element housing. An expansion valve reduces the pressure of the feed gas as it flows from the pre-heater heater element housing so as to initiate condensation. A super heater housing is at least partially located within the pressure vessel and has an inlet within the interior of the pressure vessel. The super heater housing has an outlet leading exterior of the pressure vessel. A filter within the interior of the pressure vessel is in a flow path leading from the pre-heater heater element passage housing to the super heater housing for removing condensate from the feed gas. At least one electrical heater element is in the super heater housing for heating the feed gas.

In the preferred embodiment, the pre-heater heater element housing is located within an outer housing, defining an annular passage between the pre-heater heater element housing and the outer housing. The expansion valve is located at a junction between the outlet of the inner passage and an inlet of the annular passage. The expansion valve may be located exterior of the pressure vessel or within the pressure vessel.

The filter is preferably divided into a plurality of segments that are separately removable from the pressure vessel. Each of the segments has an outer edge that comprises a portion of a cylinder and which engages an inner cylindrical wall of the pressure vessel. Each of the segments has an inner edge that abuts an inner edge of another of the segments. Drains lead from the pressure vessel on opposite sides of the filter for draining condensate from the pressure vessel.

BRIEF DESCRIPTION OF THE DRAWINGS

FIG. 1 is a schematic sectional view of an apparatus constructed in accordance with this invention.

FIG. 2 is a sectional view of the apparatus of FIG. 1 taken along the line 2-2 of FIG. 1.

FIG. 3 is a sectional view of a portion of an alternate embodiment of an apparatus in accordance with this invention.

DETAILED DESCRIPTION OF THE INVENTION

Referring to FIG. 1, fuel gas conditioning system 11 includes a pressure vessel 13 having an interior chamber 12. Pressure vessel 13 is preferably cylindrical and has two closed ends 14, 16. The length of pressure vessel 13 considerably greater than its diameter. In this example, the longitudinal axis of pressure vessel 13 is horizontal.

A pre-heater unit 15 is mounted in pressure vessel 13 with its axis parallel and offset from the longitudinal axis of pressure vessel 13. Pre-heater unit 15 has a length somewhat greater than the length of pressure vessel 13 in this example, with its ends protruding past ends 14, 16 of pressure vessel 13. Pre-heater unit 15 has an outer tubular housing 17 and a concentric inner tubular housing 19, defining an annulus 21 between housings 17, 19. A plurality of electrical heater elements 23 extend longitudinally within inner housing 19.

Heater elements 23 are conventional elements, each comprising a metal tube containing an electrical resistance wire electrically insulated from the tube. In this embodiment, heater elements 23 are U-shaped, each having its terminal ends mounted within a connector housing 25 located exterior of end 14 of pressure vessel 13. The bent portions of heater elements 23 are located near the opposite end of pre-heater unit 15. A power controller 27 supplies power via wires 29 to electrical heater elements 23. Power controller 27 varies the power in response to temperature sensed by a temperature sensor 31 that is located within chamber 12 in pressure vessel 13.

Pre-heater unit 15 has an inlet 33 that leads to the interior of inner housing 19 of pre-heater unit 15 in the portion of pre-heater unit 15 exterior of pressure vessel end 14. In the embodiment of FIG. 1, an external conduit loop 35 is located on the opposite end of pre-heater unit 15, exterior of pressure vessel end 16. External loop 35 leads from the interior of inner housing 19 to annulus 21. A variable expansion valve 37 is located in external loop 35 for reducing the pressure of the gas flowing through external loop 35, which also results in cooling of the gas. Expansion valve 37 varies the amount of pressure drop in response to a pressure sensor 39 located within pressure vessel chamber 12.

Annulus 21 has an outlet 41 located within pressure vessel chamber 12 near end 14. A mist or coalescing filter 43 is located within pressure vessel chamber 12 approximately halfway between ends 14, 16 of pressure vessel 13. Coalescing filter 43 collects liquid mist from the gas flowing from annulus outlet 41 towards the pressure vessel end 16.

A super-heater 45 is mounted in pressure vessel chamber 12. Super-heater 45 has an elongated tubular housing 47 that has an axis parallel with the axis of pre-heater unit 15 and offset from the axis of pressure vessel 13. Super-heater 45 is located above pre-heater unit 15 in this example and has a length that is less than the length of pre-heater unit 15. Super-heater 45 has an inlet 49 in housing 47, inlet 49 being within pressure vessel chamber 12 and closer to pressure vessel end 16 than end 14. Super-heater 45 has a plurality of electrical resistance heater elements 51 located within housing 47.

Electrical resistance heater elements 51 may be of the same type as electrical resistance heater elements 23 of pre-heater unit 15. Preferably, each is U-shaped with both of its terminal ends mounted within an a connector housing 53, which is external of end 14 of pressure vessel 13. A power controller 55 supplies power to electrical resistance heater elements 51. Power controller 55 controls the power in response to temperature sensed by a temperature sensor 57 located within an outlet 59 of super-heater 45. In this embodiment, outlet 59 leads from a portion of super-heater housing 47 that is external of pressure vessel 13.

Pressure vessel 13 has at least one drain 61 for draining liquid that condenses within chamber 13 upstream of filter 43 as a result of the pressure drop. A second drain 63 drains liquid that separates from the gas as a result of flowing through filter 43. Drains 61, 63 are located on opposite sides of filter 43 and lead downward from a lower point on the sidewall of pressure vessel 13. Each drain 61, 63 leads to a separate sump 65, 66. In this example, sumps 65, 66 are compartments of a single tubular pressure vessel and separated from each other by a sealed plate 67. Outlets 69, 71 lead from the bottom of sumps 65, 66 to liquid control valves 73, 75. Each liquid control valve 73, 75 has a level controller 77, 79, respectively. Level controllers 77, 79 are conventional devices to open valves 73, 75 when the levels of liquid within sumps 65, 66 reach a selected amount, so as to discharge the liquid from sumps 65, 66. Other automatic drain arrangements are feasible.

Pressure vessel 13 has a pressure relief valve 81 in communication with its chamber 12. Pressure relief valve 81 is a conventional device to relieve pressure in the event that it reaches an excessive amount. Preferably, pressure vessel 13 has an access port 82 with a removable cap. Access port 82 is located in its sidewall in this embodiment. Access port 82 is of a size selected to allow a worker to enter chamber 12 for maintenance, particularly for removing and installing coalescing filter 43, which must be done periodically.

Referring to FIG. 2, coalescing filter 43 comprises an assembly of compressible pieces or segments that define an outer diameter that sealingly engages the inner diameter of pressure vessel 13. The multiple pieces of coalescing filter 43 are sized so that each will pass through access port 82 (FIG. 1). These pieces include in this example a pair of central segments 83, 85 having inner edges 87 and outer edges 89 that are straight and parallel with each other. Inner edges 87 sealingly abut each other. Each inner edge 87 has a semi-cylindrical recess 91 for engaging super-heater 45. Each inner edge 87 has a semi-cylindrical recess 93 for fitting around pre-heater unit 15. Each central segment 83, 85 has outer diameter portions 95 on opposite ends that are partially cylindrical and sealingly engage the inner diameter of pressure vessel 13.

Coalescing filter 43 also has two side segments 97, 99 in this embodiment. Each side segment 97, 99 has a straight inner edge 101 that abuts one of the outer edges 89 of one of the central segments 83, 85. Each side segment 97 has an outer diameter portion 103 that seals against the inner diameter of pressure vessel 13. Segments 83, 85, 97 and 99 are compressible so as to exert retentive forces against each other and against pressure vessel 13 to hold them in place. Retainers (not shown) may also be employed to hold the segments of coalescing filter 43 in position.

Fuel gas conditioning system 11 serves to condition fuel gas for gas turbines. Gas turbines, particularly low pollution types, require a dry feed gas that has a selected amount of superheat, such as 50 degrees above its dew point curve. The term "superheat" is a conventional industry term to refer to a range where the pressure and temperature of the fuel gas are above a range where condensation can occur. Referring to FIG. 1, feed gas enters inlet 49 at a pressure that may be, for example, 1,000 to 1,300 psig and at a temperature from 60-80 degrees F. The feed gas flows through inner housing 19 of pre-heater unit 15, which increases the temperature of the feed gas a selected amount over the temperature of the incoming gas. For example, the temperature may be approximately 100-120 degrees F. as it exits inner housing 19, and the pressure would be approximately the same as at inlet 49.

This preheated gas then flows through expansion valve 37, causing a pressure drop to a selected level below the dew point curve, as monitored by pressure sensor 39. For example, if the intake pressure is 1,000 to 1,300 psig, the pressure may drop to approximately 450-500 psig. The temperature will also drop to perhaps 60-80 degrees F., and at this temperature and pressure, the gas will be below its dew point curve. The lower pressure cooler gas flows back through annulus 21 in pre-heater unit 15, which adds additional heat. At annulus outlet 41, the pressure may still be around 450-550 psig and the temperature may be 70-100 degrees F., but still below the dew point. Controller 27 controls the power to heater elements 23 to maintain a desired temperature at outlet 41 as monitored by sensor 31.

Because the drop in pressure at expansion valve 37 caused the gas to be below its dew point, some of the liquids contained within the gas will condense in chamber 14 upstream of filter 43. Also, liquids will be separated from the gas by coalescing filter 43 as the gas flows through coalescing filter 43. The liquids collect on the bottom of pressure vessel 13 and flow through outlets 61, 63 into sumps 65, 66 and out through valves 73, 75.

After passing through filter 43, the gas flows toward pressure vessel end 16 and enters inlet 49 of super-heater 45. Electrical resistance heater elements 51 add heat to the dry gas in an amount that will place the temperature of the gas well above its dew point curve, such as by 50 degrees. The gas, now in a superheated condition, flows out outlet 59 at for example 110-130 degrees F. and 450-550 psig. The gas from outlet 59 flows into a conventional gas turbine (not shown).

FIG. 3 shows a portion of an alternate embodiment wherein pressure vessel 105 contains an expansion valve 107 within its interior. In the first embodiment, expansion valve 37 is located on the exterior of pressure vessel 13. In FIG. 3, pre-heater inner housing 109 and outer housing 11 have one end within pressure vessel 105 instead of on the exterior as in the first embodiment. Heater elements 113 are contained within inner housing 109 as in the first embodiment. A valve actuator 115 controls the orifice of expansion valve 107. Valve actuator 115 varies the pressure drop in response to pressure sensed by a pressure sensor 117 located within the interior of pressure vessel 105. The second embodiment operates in the same manner as the first embodiment.

The gas conditioner is compact as the components are principally contained within a single pressure vessel. This arrangement reduces the amount of space required and the external flowlines connecting the various components.

While the invention has been shown in only two of its forms, it should be apparent to those skilled in the art that it is not so limited but is susceptible to various changes without departing from the scope of the invention.

The invention claimed is:

1. An apparatus for conditioning feed gas, comprising:
a pressure vessel;
a pre-heater heater element housing at least partially located within the pressure vessel, having an inner passage with an inlet for connection to a source of feed gas and an outlet for delivering the feed gas into an interior of the pressure vessel;
at least one electrical heater element located within the inner passage of the pre-heater heater element housing for increasing the temperature of the feed gas as it flows through the pre-heater heater element housing;
an expansion valve for reducing the pressure of the feed gas as it flows from the pre-heater heater element housing so as to initiate condensation;
a super heater housing at least partially located within the pressure vessel and having an inlet within the interior of the pressure vessel, the super heater housing having an outlet leading exterior of the pressure vessel;
a filter within the interior of the pressure vessel in a flow path leading from the pre-heater heater element passage housing to the super heater housing for removing condensate from the feed gas; and
at least one electrical heater element in the super heater housing for heating the feed gas; wherein:
the pre-heater heater element housing is located within an outer housing, defining an annular passage between the pre-heater heater element housing and the outer housing; and
the expansion valve is located at a junction between the outlet of the inner passage and an inlet of the annular passage.

2. An apparatus for conditioning feed gas, comprising:
a pressure vessel;
a pre-heater heater element housing at least partially located within the pressure vessel, having an inner passage with an inlet for connection to a source of feed gas and an outlet for delivering the feed gas into an interior of the pressure vessel;
at least one electrical heater element located within the inner passage of the pre-heater heater element housing for increasing the temperature of the feed gas as it flows through the pre-heater heater element housing;
an expansion valve for reducing the pressure of the feed gas as it flows from the pre-heater heater element housing so as to initiate condensation;
a super heater housing at least partially located within the pressure vessel and having an inlet within the interior of the pressure vessel, the super heater housing having an outlet leading exterior of the pressure vessel;
a filter within the interior of the pressure vessel in a flow path leading from the pre-heater heater element passage housing to the super heater housing for removing condensate from the feed gas; and
at least one electrical heater element in the super heater housing for heating the feed gas;
wherein the pre-heater heater element housing is located within an outer housing, defining an annular passage between the pre-heater heater element housing and the outer housing;
wherein the expansion valve is located at a junction between the outlet of the inner passage and an inlet of the annular passage; and
wherein the annular passage has an outlet at an end of the outer housing opposite from the outlet of the inner passage.

3. An apparatus for conditioning feed gas, comprising:
a pressure vessel;
a pre-heater heater element housing at least partially located within the pressure vessel, having an inner passage with an inlet for connection to a source of feed gas and an outlet for delivering the feed gas into an interior of the pressure vessel;
at least one electrical heater element located within the inner passage of the pre-heater heater element housing for increasing the temperature of the feed gas as it flows through the pre-heater heater element housing;
an expansion valve for reducing the pressure of the feed gas as it flows from the pre-heater heater element housing so as to initiate condensation;
a super heater housing at least partially located within the pressure vessel and having an inlet within the interior of the pressure vessel, the super heater housing having an outlet leading exterior of the pressure vessel;
a filter within the interior of the pressure vessel in a flow path leading from the pre-heater heater element passage housing to the super heater housing for removing condensate from the feed gas; and
at least one electrical heater element in the super heater housing for heating the feed gas;
wherein the expansion valve and the outlet of the inner passage are exterior of the pressure vessel.

4. An apparatus for conditioning feed gas, comprising:
a pressure vessel;
a pre-heater heater element housing at least partially located within the pressure vessel, having an inner passage with an inlet for connection to a source of feed gas and an outlet for delivering the feed gas into an interior of the pressure vessel;
at least one electrical heater element located within the inner passage of the pre-heater heater element housing for increasing the temperature of the feed gas as it flows through the pre-heater heater element housing;
an expansion valve for reducing the pressure of the feed gas as it flows from the pre-heater heater element housing so as to initiate condensation;
a super heater housing at least partially located within the pressure vessel and having an inlet within the interior of the pressure vessel, the super heater housing having an outlet leading exterior of the pressure vessel;
a filter within the interior of the pressure vessel in a flow path leading from the pre-heater heater element passage housing to the super heater housing for removing condensate from the feed gas; and
at least one electrical heater element in the super heater housing for heating the feed gas; wherein:

the filter is divided into a plurality of segments that are separately removable from the pressure vessel, each of the segments having an outer edge that comprises a portion of a cylinder and which engages an inner cylindrical wall of the pressure vessel, and each of the segments having an inner edge that abuts an inner edge of another of the segments.

5. An apparatus for conditioning feed gas, comprising:
a pressure vessel;
a pre-heater heater element housing at least partially located within the pressure vessel, having an inner passage with an inlet for connection to a source of feed gas and an outlet for delivering the feed gas into an interior of the pressure vessel;
at least one electrical heater element located within the inner passage of the pre-heater heater element housing for increasing the temperature of the feed gas as it flows through the pre-heater heater element housing;
an expansion valve for reducing the pressure of the feed gas as it flows from the pre-heater heater element housing so as to initiate condensation;
a super heater housing at least partially located within the pressure vessel and having an inlet within the interior of the pressure vessel, the super heater housing having an outlet leading exterior of the pressure vessel;
a filter within the interior of the pressure vessel in a flow path leading from the pre-heater heater element passage housing to the super heater housing for removing condensate from the feed gas; and
at least one electrical heater element in the super heater housing for heating the feed gas;
further comprising a first and second drains leading from the pressure vessel and located on opposite sides of the filter for draining condensate from the pressure vessel.

6. An apparatus for conditioning feed gas, comprising:
a pressure vessel;
a pre-heater having first and second ends, an inner housing and an outer housing at least partially located within the pressure vessel, defining an inner passage and an annular passage, the inner housing having an inlet at the first end for connection to a source of feed gas and an outlet at the second end, the outer housing having an inlet at the second end and an outlet in the vicinity of the first end that leads into the interior of the pressure vessel;
at least one electrical heater element located within the inner housing for increasing the temperature of the feed gas as it flows through the inner passage;
an expansion valve located in a flow path between the outlet of the inner housing and the inlet of the outer housing for reducing the pressure to initiate condensation of the feed gas as it flows from the inner passage to the annular passage;
a super heater having first and second ends and a tubular housing at least partially located within the pressure vessel, the housing of the super heater having an inlet at the second end of the super heater and an outlet at the first end of the super heater leading exterior of the pressure vessel;
a coalescing filter within the interior of the pressure vessel in a flow path leading from the outlet annular passage of the pre-heater to the inlet of the super heater for removing condensate from the feed gas; and
at least one electrical heater element in the super heater for heating the feed gas.

7. The apparatus according to claim 6, wherein the first end of the pre-heater is exterior of the pressure vessel.

8. The apparatus according to claim 6, wherein the first end of the super heater is exterior of the pressure vessel.

9. The apparatus according to claim 6, wherein the expansion valve and the first and second ends of the pre-heater are exterior of the pressure vessel.

10. The apparatus according to claim 6, wherein the first end of the pre-heater is exterior of the pressure vessel, and the second end of the pre-heater and the expansion valve are within the pressure vessel.

11. The apparatus according to claim 6, wherein the first end and the outlet of the super heater are exterior of the pressure vessel, and the second end and the inlet of the super heater are within the interior of the pressure vessel.

12. The apparatus according to claim 6, wherein the filter has a pre-heater aperture that sealingly surrounds the pre-heater and a super heater aperture that sealingly surrounds the super heater.

13. The apparatus according to claim 6, wherein:
the filter is divided into a plurality of segments that are separately removable from the pressure vessel, each of the segments having a partially cylindrical outer edge that engages an inner cylindrical wall of the pressure vessel, and each of the segments having an inner edge that abuts an inner edge of another of the segments.

14. The apparatus according to claim 6, further comprising a first and second drains leading from the pressure vessel and located on opposite sides of the filter for draining condensate from the pressure vessel.

15. A method for conditioning feed gas, comprising:
providing a pressure vessel;
mounting a pre-heater heater element housing at least partially located within the pressure vessel, the pre-heater heater element housing having at least one electrical heater element;
mounting a super heater housing at least partially located within the pressure vessel, the super heater housing having at least one electrical heater element;
mounting a filter within the pressure vessel;
applying electrical power to the heater elements in the pre-heater heater element housing and the super heater housing;
flowing feed gas into the pre-heater heater element housing, thereby increasing the temperature of the feed gas; then
expanding the feed gas flowing from the pre-heater heater element housing to drop the temperature of the feed gas below a dew point of the feed gas, causing condensate to form; then
flowing the feed gas through the filter to separate condensate from the feed gas; then
flowing the feed gas through the super heater housing to heat the feed gas, then discharging the feed gas from the pressure vessel;
further comprising:
after expanding the feed gas, flowing the feed gas through an outer housing that is at least partially located in the pressure vessel and surrounds the pre-feeder heater element housing.

* * * * *